United States Patent
Baumann et al.

(10) Patent No.: US 8,818,594 B2
(45) Date of Patent: Aug. 26, 2014

(54) METHOD FOR OPERATING A HYBRID VEHICLE

(75) Inventors: Christoph Baumann, Sonnenbuehl (DE); Thomas Rauner, Blaubeuren (DE); Stefan Fischer, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 30 days.

(21) Appl. No.: 13/489,775

(22) Filed: Jun. 6, 2012

(65) Prior Publication Data
US 2012/0316718 A1 Dec. 13, 2012

(30) Foreign Application Priority Data
Jun. 9, 2011 (DE) .......................... 10 2011 050 980

(51) Int. Cl.
| B60W 20/00 | (2006.01) |
| B60W 10/06 | (2006.01) |
| B60K 6/48 | (2007.10) |
| B60K 15/035 | (2006.01) |

(52) U.S. Cl.
CPC ............. B60W 20/108 (2013.01); B60W 10/06 (2013.01); B60K 6/48 (2013.01); B60K 15/03504 (2013.01); Y10S 903/903 (2013.01)
USPC ........ 701/22; 180/65.25; 180/65.28; 903/903

(58) Field of Classification Search
CPC ...... B60W 20/108; B60W 10/06; B60K 6/48; B60K 15/03504
USPC ............ 701/22, 2; 180/65.25, 65.28; 903/903
See application file for complete search history.

(56) References Cited

U.S. PATENT DOCUMENTS

| 5,371,412 | A |   | 12/1994 | Iwashita et al. |
| 5,481,170 | A | * | 1/1996 | Edelen et al. ................. 318/650 |
| 5,533,487 | A | * | 7/1996 | Cailey ...................... 123/568.17 |
| 6,307,277 | B1 | * | 10/2001 | Tamai et al. ................ 290/40 C |
| 6,557,534 | B2 |   | 5/2003 | Robichaux et al. |
| 7,021,409 | B2 |   | 4/2006 | Tamor |
| 7,099,757 | B2 | * | 8/2006 | Niki et al. ........................ 701/22 |
| 7,412,310 | B2 | * | 8/2008 | Brigham et al. ................ 701/22 |
| 7,484,503 | B2 | * | 2/2009 | Wyatt et al. .............. 123/568.16 |
| 7,823,471 | B2 | * | 11/2010 | Tamai et al. .................... 74/89.4 |
| 7,866,424 | B2 |   | 1/2011 | Sauvlet et al. |
| 8,035,532 | B2 | * | 10/2011 | Vosz .......................... 340/932.2 |

(Continued)

FOREIGN PATENT DOCUMENTS

| DE | 101 49 905 | 8/2002 |
| DE | 102 00 016 | 10/2002 |

(Continued)

*Primary Examiner* — Tuan C. To
(74) *Attorney, Agent, or Firm* — Gerald E. Hespos; Michael J. Porco; Matthew T. Hespos

(57) ABSTRACT

A method is provided for operating a hybrid vehicle (1) having an internal combustion engine (2), an electric machine (4) and having a regenerable filter device that absorbs fuel vapors from a fuel tank of the internal combustion engine. To improve the reproducible operation of a hybrid vehicle with an internal combustion engine and an electric machine, in a purely electric driving mode in which the hybrid vehicle (1) is driven only by the electric machine (4), the regenerable filter device is rinsed by switching on the internal combustion engine (2) with a scavenging strategy that is dependent on the velocity of the hybrid vehicle (1).

9 Claims, 1 Drawing Sheet

(56) References Cited

U.S. PATENT DOCUMENTS

| | | | |
|---|---|---|---|
| 8,219,303 B2* | 7/2012 | Schwenke et al. | 701/111 |
| 2002/0117338 A1* | 8/2002 | Itou | 180/54.1 |
| 2006/0218903 A1* | 10/2006 | Ogata | 60/295 |
| 2010/0043414 A1* | 2/2010 | Hirose | 60/320 |
| 2010/0223910 A1* | 9/2010 | Funk et al. | 60/277 |
| 2011/0029176 A1 | 2/2011 | Rauner et al. | |
| 2011/0072802 A1* | 3/2011 | Bidner et al. | 60/287 |
| 2011/0160982 A1* | 6/2011 | Kumar et al. | 701/103 |
| 2011/0197568 A1* | 8/2011 | Beaucaire et al. | 60/286 |
| 2012/0000187 A1* | 1/2012 | Mullins et al. | 60/277 |

FOREIGN PATENT DOCUMENTS

| | | |
|---|---|---|
| DE | 10 2007 002 188 | 7/2008 |
| DE | 10 2008 052 759 | 4/2010 |
| DE | 10 2009 035 845 | 2/2011 |
| EP | 2216531 A1 * | 8/2010 |
| JP | 2011032921 A * | 2/2011 |
| WO | WO 2006101070 A1 * | 9/2006 |

* cited by examiner

METHOD FOR OPERATING A HYBRID VEHICLE

CROSS REFERENCE TO RELATED APPLICATION

This application claims priority under 35 USC 119 to German Patent Appl. No. 10 2011 050 980.1 filed on Jun. 9, 2011, the entire disclosure of which is incorporated herein by reference.

BACKGROUND OF THE INVENTION

1. Field of the Invention

The invention relates to a method for operating a hybrid vehicle having an internal combustion engine and an electric machine, and having a regenerable filter device that absorbs fuel vapors from a fuel tank of the internal combustion engine.

2. Description of the Related Art

German laid-open patent application DE 10 2007 002 188 A1 discloses a hybrid vehicle having an electric motor and an internal combustion engine. The internal combustion engine does not run continuously, but instead is switched off when a drive is provided purely by electric motor. Hydrocarbons scavenged from a filter device into an intake section cannot be burned in the switched-off state. A control device of the known hybrid vehicle switches on the internal combustion engine in an electric operating mode of the hybrid vehicle as a function of a charge state of the filter device. As a result, hydrocarbons scavenged into the intake section can be fed from the filter material to combustion.

The object of the invention is to improve the reproducible operation of a hybrid vehicle having an internal combustion engine and an electric machine and having a regenerable filter device that absorbs fuel vapors from a fuel tank of the internal combustion engine, in particular in a specific test operating mode.

SUMMARY OF THE INVENTION

The invention relates to a method for operating a hybrid vehicle having an internal combustion engine, an electric machine, and a regenerable filter device that absorbs fuel vapors from a fuel tank of the internal combustion engine. In a purely electric driving mode in which the hybrid vehicle is driven only by the electric machine, the regenerable filter device is rinsed by switching on the internal combustion engine with a scavenging strategy that is dependent on the velocity of the hybrid vehicle. The filter device preferably comprises an activated carbon filter that is scavenged when the internal combustion engine is switched on and a clutch is opened or closed. When the activated carbon filter is scavenged, the vapors stored in the activated carbon filter are fed to combustion when the internal combustion engine is running to generate the filter device. The scavenging of the activated carbon filter prevents fuel vapors from the filter device from getting into the surroundings. The scavenging strategy is dependent on the velocity of the hybrid vehicle and can prevent undesired overflowing or puncturing of the activated carbon filter without the driving comfort being affected adversely.

The scavenging strategy that is dependent on the velocity of the hybrid vehicle may switch on the internal combustion engine only in a velocity range in which operating noises of the internal combustion engine cannot be perceived acoustically, are virtually acoustically imperceptible or are not disruptive. The internal combustion engine is not be operated at the full rotational speed to scavenge the filter device.

The internal combustion engine preferably is switched on to regenerate the filter device when an upper limiting velocity is reached in the purely electric driving mode. The upper limiting velocity preferably is 40 to 50 kilometers per hour, and preferably approximately 40 kilometers per hour.

The internal combustion engine preferably is switched off when a lower limiting velocity is reached in the purely electric driving mode. The lower limiting velocity is lower than the upper limiting velocity and preferably is 20 to 30 kilometers per hour, and most preferably approximately 30 kilometers per hour.

The scavenging strategy that is dependent on the velocity of the hybrid vehicle preferably switches on the internal combustion engine only if a charge state of the regenerable filter device is critical. The charge state of the regenerable filter device preferably is determined using a computational model. Alternatively or additionally, a temperature sensor can be used in the regenerable filter device as an indicator for the risk of puncturing the filter. The air mass flow rate integral from the tank ventilation is used as an abort criterion for the scavenging strategy of the invention.

The concentration of the fuel vapors in the fuel tank and in the filter device is increased during the refueling process. Therefore, the scavenging strategy that is dependent on the velocity of the hybrid vehicle preferably is applied after refueling.

Measures are taken to heat a catalytic converter device, preferably with the clutch opened and the internal combustion engine switched on, to improve the efficiency of the catalytic converter device. The scavenging strategy that is dependent on the velocity of the hybrid vehicle preferably is applied after a catalytic converter heating phase.

The hybrid vehicle preferably is a parallel hybrid with a clutch. Thus, the internal combustion engine and the electric machine can be used individually or together to drive at least one axle of the hybrid vehicle by means of the clutch. When the clutch is opened, the internal combustion engine is separated or disconnected in terms of drive from the electric machine and can be operated autonomously. The internal combustion engine is switched on in the purely electric driving mode to regenerate the filter device and can in the process make a contribution to driving the hybrid vehicle and/or to charging a battery of the hybrid vehicle. The scavenging strategy according to the invention permits the regeneration capability of the filter device to be improved significantly, in particular in a test cycle with the abbreviation FTP 75.

Further advantages, features and details of the invention can be found in the following description in which various exemplary embodiments are described in detail with reference to the drawing.

DETAILED DESCRIPTION OF THE PREFERRED EMBODIMENTS

Figure 1:
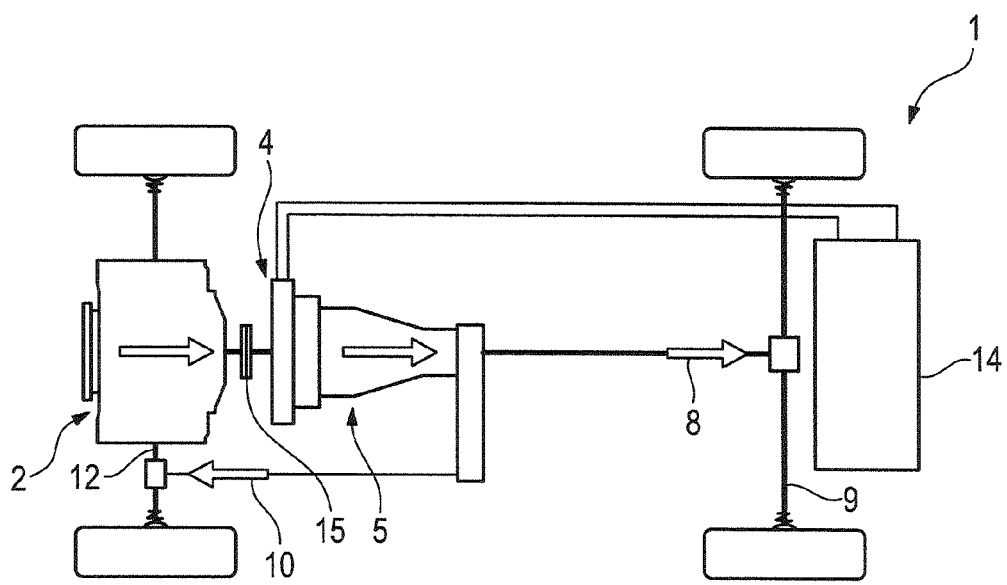
FIG. 1 is a simplified illustration of a hybrid vehicle.

FIG. 1 illustrates a hybrid vehicle 1 having an internal combustion engine 2 and an electric machine 4 in a highly simplified form. The hybrid vehicle 1 is a parallel hybrid vehicle in which the internal combustion engine 2 and the electric machine 4 are arranged on an input shaft of a transmission 5. In this context, the internal combustion engine 2 and the electric machine 4 can respectively drive the hybrid vehicle 1 individually or together.

A clutch 15 is provided between the internal combustion engine 2 and the electric machine 4. If the clutch 15 is opened, only the electric machine 4 is connected to the input shaft of the transmission 5 to drive the hybrid vehicle 1. If the clutch 15 is closed, the internal combustion engine 2 also is connected to the input shaft of the transmission 5 to drive the hybrid vehicle 1 either alone or together with the electric machine 4.

An arrow 8 indicates that the internal combustion engine 2 and/or the electric machine 4 can be used to drive a front axle 9. A further arrow 10 indicates that the internal combustion engine 2 and/or the electric machine 4 alternatively or additionally can be used to drive a rear axle 12 of the hybrid vehicle 1.

The electric machine 4 is supplied with electrical energy from an electric energy accumulator 14, in particular a high voltage battery. The internal combustion engine 2 is supplied with fuel from a fuel tank. The fuel vapors that occur in the fuel tank are absorbed by a filter device that is assigned to the fuel tank and comprises an activated carbon filter. The filter device can only absorb a specific quantity of fuel vapors.

The filter device must be scavenged regularly for regeneration to prevent the activated carbon filter from being punctured and fuel vapors getting into the surroundings. For this purpose, the internal combustion engine 2 is started to generate a partial vacuum so that the stored fuel vapors are sucked out of the filter device into the internal combustion engine 2 where they are burned.

A specific operating method for the hybrid vehicle 1 is provided for purely electric travel in which the hybrid vehicle 1 is driven exclusively by the electric machine 4. In this operating method, the clutch 15 is opened and the internal combustion engine 2 is stationary and not switched on. However, fuel vapors from the fuel tank are absorbed by the filter device even with the internal combustion engine 2 switched off. Therefore, the invention provides that the internal combustion engine 2 is activated at certain times. During these times, the clutch 15 between the electric machine 4 and the internal combustion engine 2 can be closed. The internal combustion engine 2 then is switched on to scavenge the filter device, and can contribute to driving the hybrid vehicle 1.

The activation of the internal combustion engine 2 is controlled by a control device, for example as a function of the charging of the activated carbon filter with fuel vapors, which is detected by means of a sensor. The activation of the internal combustion engine 2 also can be controlled by the temperature of a catalytic converter in the exhaust system of the internal combustion engine 2. The activation of the internal combustion engine 2 alternatively or additionally can be controlled as a function of time.

Figure 2:
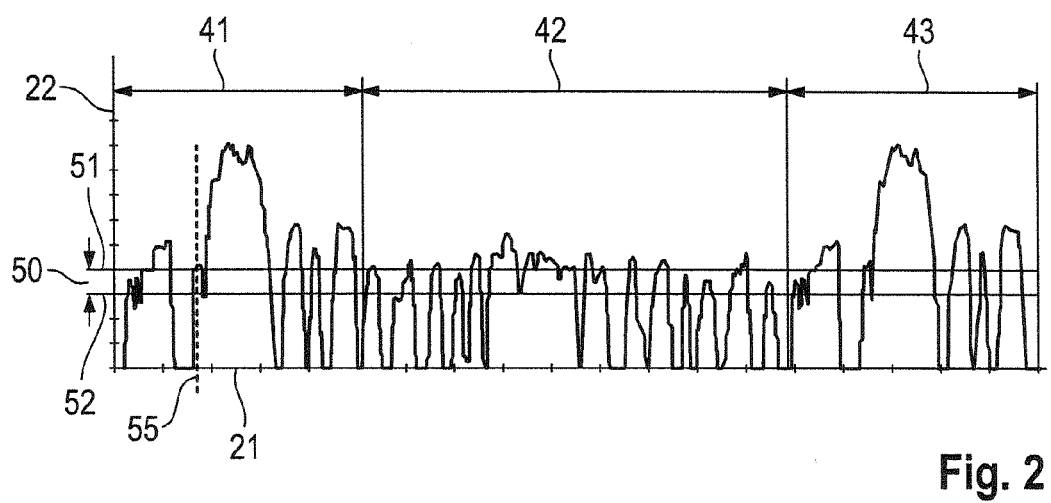
FIG. 2 is a Cartesian coordinate diagram illustrating the method of the invention.

FIG. 2 illustrates a phase sequence of an FTP75 driving cycle in a Cartesian coordinate diagram with an x axis 21 and a y axis 22. Time is plotted in seconds on the x axis 21. The velocity of the hybrid vehicle 1 of FIG. 1 is plotted in kilometers per hour on the y axis 22.

The exhaust gases generated by the internal combustion engine 2 during the execution of the test cycle are absorbed in three different bags in three time periods 41, 42, 43. The associated test cycle therefore also is referred to as a three bag test. An interval of ten minutes is placed between the two time periods 42 and 43.

According to the scavenging strategy of the invention the internal combustion engine is switched on only in a velocity range 50 to scavenge the filter device. The velocity range 50 is limited in the upward direction by an upper limiting velocity 51 of 40 kilometers per hour and is limited in the downward direction by a lower limiting velocity 52 of 30 kilometers per hour. Other velocity ranges may be appropriate depending on the vehicle or engine arrangement. The velocity ranges depend on the configuration of the internal combustion engines and the power of the electric machines.

A catalytic converter heating phase is carried out with the clutch open after a refueling process has been detected by a corresponding refueling detection device. A catalytic converter device of the hybrid vehicle is heated by the internal combustion engine during the catalytic converter heating phase.

Various diagnostic methods are carried out during operation of the hybrid vehicle. Scavenging the filter device and ventilating the tank may not be appropriate during the diagnostic methods. Charging the filter device with fuel vapors is monitored or determined by means of a suitable computational model.

The clutch is opened in the catalytic converter heating phase up to a time 55. The clutch then can be closed. Starting from the time 55 the internal combustion engine is started at velocities higher than 40 kilometers per hour to scavenge the filter device.

The operating noises generated by the internal combustion engine during scavenging cannot be perceived in the velocity range 50. During scavenging the load points of the internal combustion engine preferably are in ranges in which the operating noises of the internal combustion engine cannot be heard.

If the hybrid vehicle undershoots the lower limiting velocity 52 of 30 kilometers per hour, the internal combustion engine is switched off again. The scavenging strategy according to the invention is active until the charging of the filter device, in particular of the activated carbon filter, has reached a desired low level.

What is claimed is:

1. A method for operating a hybrid vehicle having an internal combustion engine, an electric machine, a fuel tank and a regenerable filter device that absorbs fuel vapors from the fuel tank of the internal combustion engine, the method comprising:
    defining a range of speeds of the vehicle at which noise associated with operating the internal combustion engine is not accoustically objectionable;
    driving the vehicle exclusively by the electric machine in a purely electric driving mode while keeping the internal combustion engine switched off;
    absorbing fuel vapors from the fuel tank in the regenerable filter device while operating the vehicle in the purely electric driving mode;
    measuring a charge state of the regenerable filter device;
    measuring vehicle speed while driving the vehicle in the purely electric driving mode; and
    switching on the internal combustion engine for rinsing the regenerable filter device and combusting the fuel vapors absorbed therein if the charge state of the regenerable filter device is above a desired low level and the speed of the vehicle is in the defined range of speeds at which noise associated with operating the internal combustion engine is not accoustically objectionable.

2. The method of claim 1, further comprising switching on the internal combustion engine to regenerate the filter device when the measured speed reached in the purely electric driving mode is an upper limiting velocity.

3. The method of claim 2, wherein the upper limiting velocity is 40 to 50 kilometers per hour.

4. The method of claim 2, further comprising switching off the internal combustion engine when the measured speed reached in the purely electric driving mode is a lower limiting velocity.

5. The method of claim 4, wherein the lower limiting velocity is 20 to 30 kilometers per hour.

6. The method of claim 1, wherein the hybrid vehicle is a parallel hybrid with a clutch.

7. The method of claim 1, further comprising switching on the internal combustion engine at any speed if the measured charge state of the regenerable filter device is determined to be critically high.

8. The method of claim 1, further comprising determining the occurrence of a refueling process, switching on the internal combustion engine after the refueling process regardless of the measured speed and switching off the internal combustion engine when the charge state of the regenerable filter device reaches the desired low level.

9. The method of claim 1, further comprising sensing a catalytic converter heating phase and switching on the internal combustion engine after the catalytic converter heating phase.

\* \* \* \* \*